United States Patent
Nair et al.

(10) Patent No.: US 6,337,863 B1
(45) Date of Patent: Jan. 8, 2002

(54) SEAMLESS COMMUNICATION SERVICE WITH INTELLIGENT EDGE DEVICES

(75) Inventors: Shekar G. Nair, Moorpark; John W. Bailey, Agoura Hills, both of CA (US)

(73) Assignee: Alcatel Interworking, Inc., Calabasas, CA (US)

( * ) Notice: Subject to any disclaimer, the term of this patent is extended or adjusted under 35 U.S.C. 154(b) by 0 days.

(21) Appl. No.: 09/639,371

(22) Filed: Aug. 15, 2000

Related U.S. Application Data

(63) Continuation of application No. 08/782,444, filed on Jan. 17, 1997, now abandoned.

(51) Int. Cl.$^7$ .............................................. H04L 12/28
(52) U.S. Cl. ...................................... 370/395; 370/437
(58) Field of Search ........................... 370/395.99, 230, 370/389, 475, 248, 252, 431, 432, 437, 474

(56) References Cited

U.S. PATENT DOCUMENTS

| | | | | |
|---|---|---|---|---|
| 4,823,338 A | * | 4/1989 | Chan et al. .................. | 370/522 |
| 5,394,402 A | | 2/1995 | Ross | |
| 5,740,171 A | * | 4/1998 | Mazzola et al. ............. | 370/392 |
| 5,742,604 A | * | 4/1998 | Edsall et al. ................. | 370/401 |
| 5,752,003 A | * | 5/1998 | Hart ............................ | 709/223 |
| 5,812,552 A | * | 9/1998 | Arora et al. ................. | 370/401 |

OTHER PUBLICATIONS

Stallings, Local and Metropolitan Area Networks, PP: 338–351, 1997.*
Sackett, ATM & Multiprotocol Networking, PP: 267–288.*
Perlman, Interconnections: Bridges and Routers, pp. 83–97 (1992).
The ATM Forum Technical Committee: LAN Emulation Over ATM, Verison 1.0 (Jan. 1995).

\* cited by examiner

*Primary Examiner*—David R. Vincent
(74) *Attorney, Agent, or Firm*—Christie, Parker & Hale, LLP

(57) ABSTRACT

A service for providing seamless communication between stations over an ATM network. Seamless communication services are distributed among intelligent "peer" members. A single service member is selected as a "master" member for purposes of service configuration. The master member advertises the addresses of all members to every other member so that every member can configure virtual circuits to every other member. In the provision of services, each member constructs a member table which associates other members with a point-to-point virtual circuit and a learning table which associates globally recognized representations of addresses of stations behind other peer members with a point-to-point virtual circuit. The service supports multiple LAN media and multiple virtual local area networks (VLANs).

23 Claims, 14 Drawing Sheets

SEAMLESS COMMUNICATION SERVICE WITH INTELLIGENT EDGE DEVICES

This application is a continuation of patent application Ser. No. 08/782,444, filed Jan. 17, 1997, now abandoned.

FIELD OF THE INVENTION

The present invention relates to computer networking. More particularly, the present invention relates to devices and methods for seamlessly interconnecting stations over an asynchronous transfer mode (ATM) network.

BACKGROUND OF THE INVENTION

A local area network (LAN) segment is a computer sub-network which includes multiple stations in the same physical area communicating by forwarding messages on a shared LAN media Stations on different LAN segments in the same physical area often communicate through a shared LAN switching fabric, which selectively forwards messages received over the fabric to the destination LAN segment. Stations on different LAN segments in different physical areas, in contrast, often communicate over an ATM network which interconnects multiple LAN switches or bridges on the edge of the network. In such an arrangement, each LAN switch or bridge selectively forwards messages received over the ATM network to the destination LAN segment.

An ATM network may be a "backbone" network in a campus environment or a wide area network (WAN). Importantly, an ATM network may not only support multiple LAN segments in different physical areas; it may also support multiple virtual LANs (VLANs). A VLAN is an aggregate of LAN segments which are part of the same logical group, but not necessarily the same physical group. By limiting the flow of messages across VLAN boundaries, an ATM network can conserve network bandwidth and enhance network security.

Communication over ATM networks differs from communication on LAN segments, and from communication between LAN segments over LAN switches and bridges, in terms of the way messages are delivered. A station desiring to communicate with another station on the same LAN segment does not need to know where the destination station is located within the segment. Instead, the source station relies on the broadcast capability of the LAN media to propagate all messages to all stations on the segment An interface on the intended destination station captures the message. Other interfaces on the segment ignore the message. Similarly, if a message propagated on a LAN segment is destined for a station on a different LAN segment associated with the same LAN switch or bridge, the LAN switch or bridge interconnecting the two segments will typically capture and propagate the message on a switching fabric connecting the two segments. In turn, an interface on the LAN switch or bridge associated with the intended destination LAN segment captures and propagates the message on the segment. Other interfaces on the LAN switch/bridge ignore the message. Again, there is no requirement that the source station know where the intended destination station resides within the network for successful communication. Rather, communication between the stations on different LAN segments over the LAN switch/bridge is "seamless" because the stations can communicate as if they are on the same LAN segment.

In contrast, ATM networks are not broadcast-oriented. Communicating over an ATM network, whether implemented as a backbone or WAN, requires that point-to-point connections be established across the ATM network. This requires that the location of the intended destination station be known prior to message forwarding over the network. Thus, a desire has arisen for services which extend LAN-type "plug-and-play" to ATM networks by meeting ATM's requirement of point-to-point connections without having to configure on every source station a point-to-point mapping over the ATM network to every possible destination station.

One way to provide such seamless communication is to have devices on the edge of the ATM network (e.g., LAN switches or bridges) learn the locations Q all stations connected to the network and provide the necessary connections over the network. A widely-used technique for creating such an environment is the ATM Forum's LAN Emulation (LANE) protocol. This technique emulates a LAN environment using LANE services (including a configuration server, a control server, a broadcast and unknown server) which assists multiple LANE "clients" in communicating over the ATM network. The clients are the devices on the edge of the ATM network, typically LAN switches or bridges. Where the client is a LAN switch or bridge, the client is assigned an ATM address. Behind the client are multiple stations with distinct media access control (MAC) addresses. When a message is presented for forwarding over the ATM network, the client typically resolves the destination MAC address encoded in the message, which is a unique address of a station behind another client, to the ATM address of the other client provided by the control server. By doing so, the LANE protocol allows clients to set-up connections across the ATM network dynamically on an "as needed" basis. This allows seamless communication between stations behind one client and stations behind another client.

The ATM Forum's LANE protocol, however, has certain limitations. First, the LANE protocol concentrates control functions for the entire "emulated LAN" in centralized servers. Such concentration of resources means that failure of a single server can bring down the entire service. Second, LANE protocol requires that each participating client follow detailed configuration, join, registration, learning and connection set-up procedures. Third, LANE protocol requires that messages be formatted for the particular LAN media which the ATM network is "emulating" (e.g., Token Ring) before forwarding the messages over the ATM network. This often necessitates media translations before message forwarding can proceed. Such requirements have hindered the robustness of seamless communication over ATM networks.

Accordingly, there is a need for a simple and less cumbersome service for providing seamless communication over an ATM network.

SUMMARY OF THE INVENTION

It is an object of the present invention to provide a service for seamless communication over an ATM network which will not be brought down in the event of a single point failure.

It is another object of the present invention to provide a service for seamless communication over an ATM network with efficient message forwarding over optimized, permanently configured connections.

It is another object of the present invention to provide a service for seamless communication over an ATM network which is self-configuring.

It is another object of the present invention to provide a service for seamless communication over an ATM network which can support multiple LAN media types.

It is another object of the present invention to provide a service for seamless communication over an ATM network which can support multiple VLANs.

It is another object of the present invention to provide a service for seamless communication over an ATM network which can operate in multiple instances on a single interface (or multiple interfaces) of a single edge device.

These and other objects of the present invention are achieved using a plurality of intelligent devices at the edge of an ATM network which serve as peer members of one or more instances of a seamless communication service.

In one aspect of the invention, configured on each member of a service instance are a "broadcast out" table which associates other members with a single, point-to-multipoint "broadcast out" virtual circuit and a member table which associates each other member with a point-to-point "direct" virtual circuit and a point-to-point "broadcast in" virtual circuit.

In another aspect of the invention, the service instance is self-configuring. A single edge device is selected as a "master" member for purposes of service configuration. Other edge devices seeking to join the service are supplied with the ATM address of the master member and use the address to advertise their respective ATM addresses to the master member. The master-member, in turn, advertises the addresses to all joining members so that joining members can configure member and "broadcast out" tables associating other members with virtual circuits negotiated with other members using ATM signalling procedures.

In another aspect of the invention, when a member is presented with a message encoded with a unicast destination address for forwarding over the ATM network, a representation of the destination address is looked-up in the member's learning table. If an entry for the destination address is not found, i.e., if the message is "unknown unicast", the message is formatted and forwarded to all other members on the "broadcast out" virtual circuit. Alternatively, unknown unicast messages may be copied formatted and forwarded to all other members on the "direct" virtual circuits. When the message arrives at the receiving members, the members look-up a representation of the source s address encoded in the message in their respective learning tables to determine if the address has been leaned, i.e., associated with the "direct" virtual circuit to the forwarding member. If the address has not been learned, the receiving members use the "broadcast in" virtual circuit identifier encoded in the message to associate the source address representation with the "direct" virtual circuit to the forwarding member and store the related pairs in their respective learning tables. Since the stored source address representations are associated with stations behind other members, the members can use the related pairs to resolve the destination addresses of future messages presented for forwarding to such addresses to a "direct" virtual circuit to the receiving member. Thus, such future messages will be "known unicast" and can be formatted and forwarded on the "direct" virtual circuit to the receiving member using a simple table look-up, without the need for a broadcast. All addresses are stored in the learning table in a common bit order format to avoid duplicative learning and retrieval errors.

In another aspect of the invention, when a member is presented with a message having a broadcast or multicast destination address for forwarding over the ATM network, the message is formatted and forwarded to all other members on the "broadcast out" virtual circuit. Alternatively, broadcast and multicast messages may be copied, formatted and forwarded to all other members on the "direct" virtual circuits.

In another aspect of the invention, the service supports multiple LAN media. Thus, any required media translations are performed only after the message, has been captured off the ATM network by a receiving member, before transmitting on the LAN media.

In another aspect of the invention, the service supports multiple VLANs. Each message forwarded over the ATM network is encoded with the identifier of a VLAN. When the message is forwarded to another member, the receiving member verifies that the VLAN identifier encoded in Me message is active on a station behind the member. If no VLAN match is found, the message is dropped without further processing. When the service is implemented with multiple VLANs, it can be described as a VLAN cluster service (VCS).

In another aspect of the invention, the service can operate in multiple instances on a single interface of a single edge device. When the message is forwarded to an edge device, the receiving edge device verifies that the virtual circuit identifier encoded in the message is associated with at least one VCS instance to which the edge device belongs. If the virtual circuit identifier is not found, the message is dropped without further processing.

The present invention can be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
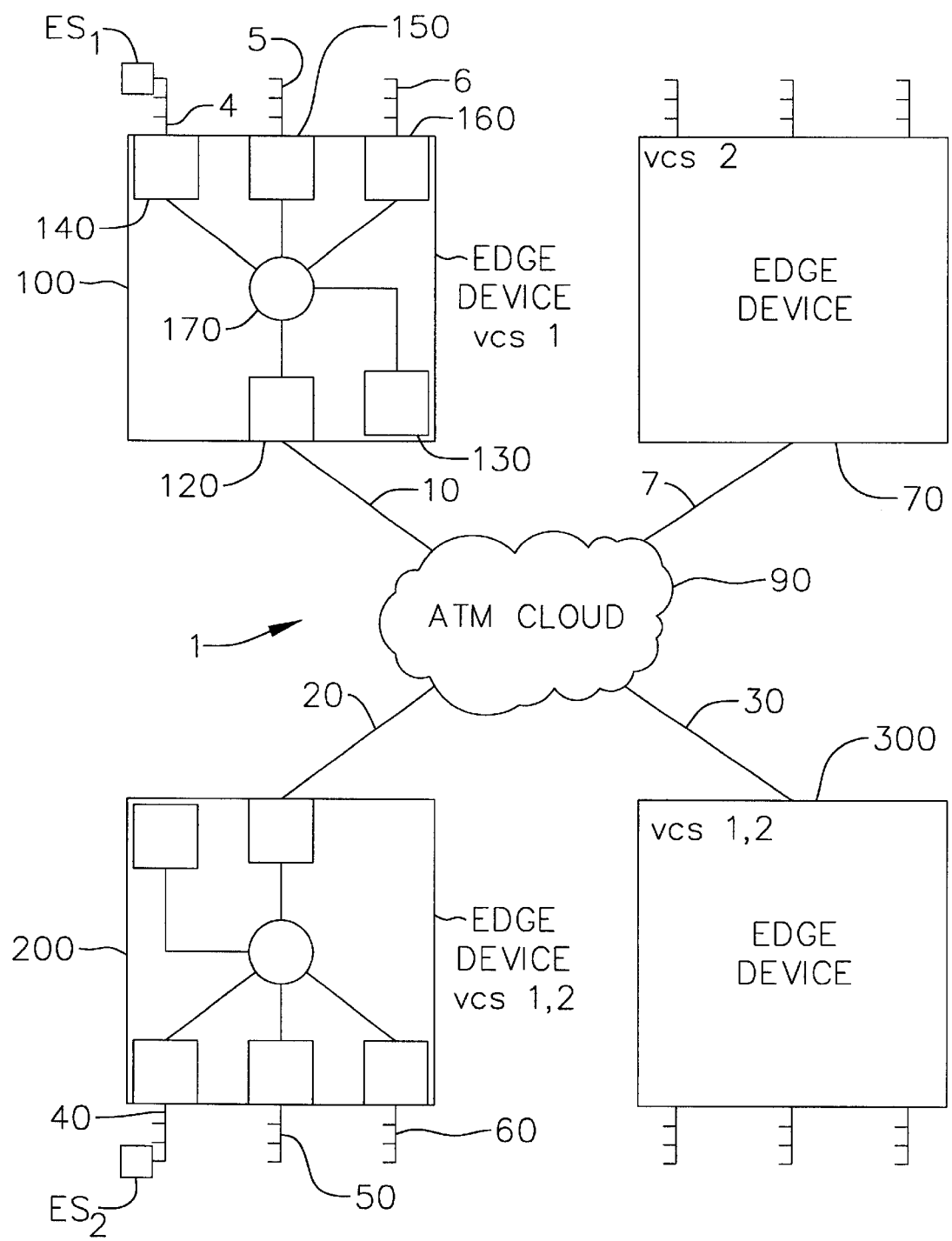
FIG. 1 is a schematic of a communication network operating in accordance with the present invention.

Referring to FIG. 1, a computer network 1 operating in accordance with a preferred embodiment of the present invention is shown. Network 1 includes multiple edge devices 100, 200, 300, 70 interconnected over an ATM network via an ATM cloud 90. ATM cloud 90 is a transmission medium interconnecting edge devices over one or more ATM switches using cables. As illustrated, edge devices 100, 200, 300, 70 are connected using cables 10, 20, 30, 7. Cables 10, 20, 30, 7 may be fiber optic, unshielded twisted pair or other form. In the illustrated embodiment, edge devices 100, 200, 300 are members of a single, common VLAN Cluster Service (VCS) instance $vcs_1$, while edge device 70 is interconnected to ATM cloud 90, but is not a member of the particular VCS instance $vcs_1$. Membership in a VCS instance is defined by an edge device's provision of seamless communication services between stations behind the edge device and stations behind other edge devices which are members of the same VCS instance. It will be appreciated that members 100, 200, 300 may be members of multiple VCS instances with other edge devices, including edge device 70. For instance, in FIG. 1, edge devices 200, 300, 70 are members of the single, common VCS instance $vcs_2$, to which edge-device 100 does not belong. Behind members are LAN segments (e.g., 40, 50, 60) which may utilize disparate LAN media such as Ethernet, Token Ring or FDDI. Associated with each LAN segment (e.g., 40) are multiple stations (e.g., $ES_2$.) Although FIG. 1 VCS instances $vcs_1$ and $vcs_2$ are each illustrated to include three members, a particular VCS instance may include one or more members.

Figure 2:
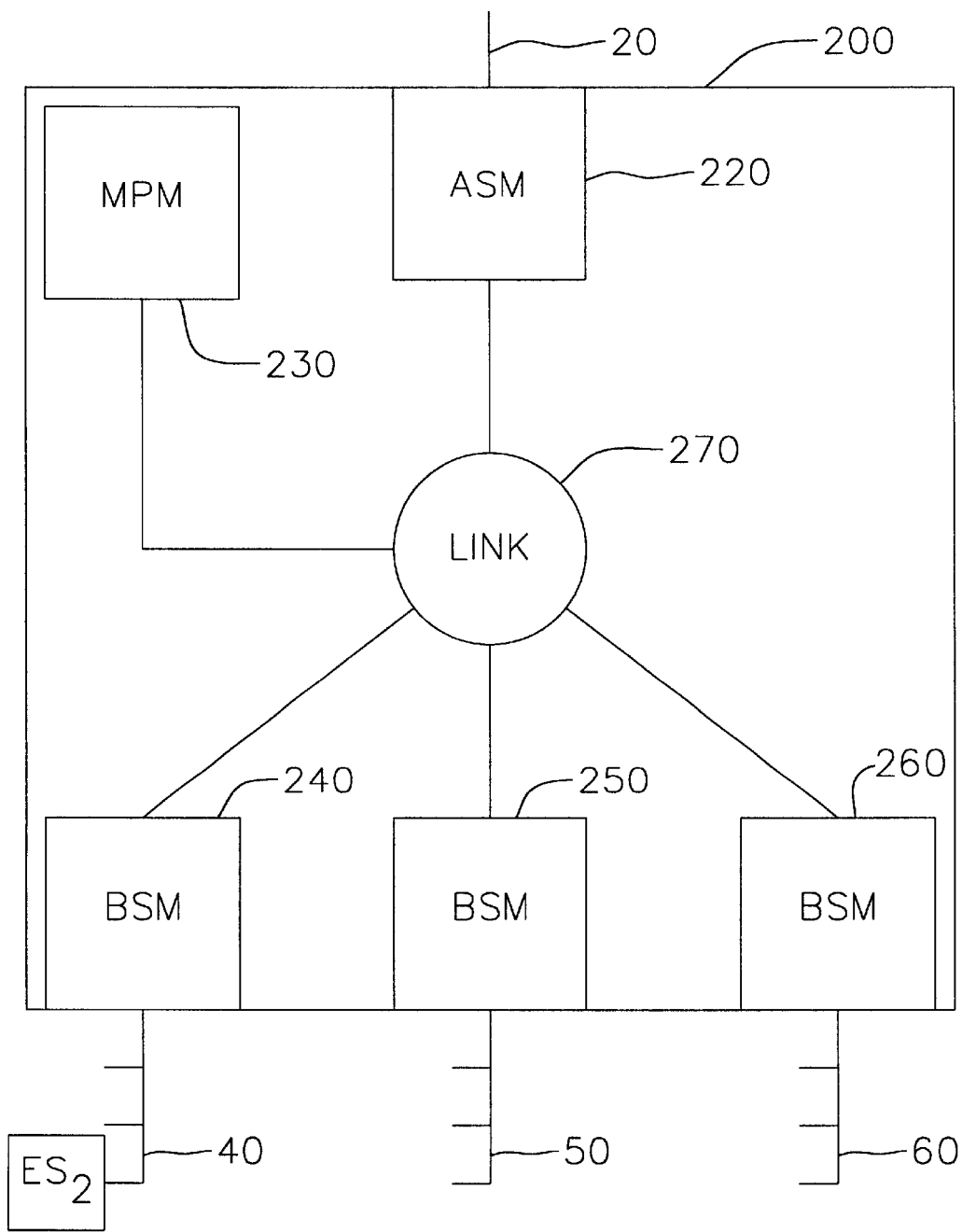
FIG. 2 is a schematic of an edge device operating in accordance with the present invention.

Turning to FIG. 2 member 200 is shown in greater detail. Member 200 includes basic switching modules (13SMs) 240, 250, 260 and ATM switching module (ASM) 220. BSMs 240, 250, 260 each have a port interfacing with their respective LAN segments 40, 50, 60 and a port interfacing with a switching link 270. BSMs 240, 250, 260 and ASM 220 are each assigned a port identifier. BSMs 240, 250, 260 each include hardware or software means for formatting messages received from their respective LAN segment 40, 50, 60 in a manner sufficient to enable other BSMs and the ASM 220, upon receiving the message over switching link 270, to locate recognize a destination MAC address encoded in the message and to locate and recognize a port identifier of a forwarding BSM. BSMs 240, 250, 260 also include means for identifying and retrieving a port identifier and LAN media type encoded in a message received over switching link 270. BSMs 240, 250, 260 further include means for determining from port records if the port identifier is associated with a VLAN active on BSMs 240, 250, 260. A working copy of port records is preferably stored in hardware on BSMs 240, 250, 260 with a master copy stored on the management processor module (NTM) 230. The VLAN association operation can be performed implementing known memory access mechanisms in hardware or software. BSMs 240, 250, 260 also include hardware or software means for translating messages received from other BSMs and the ASM 220 over switching link 270 into the LAN media format required by their respective LAN segments 40, 50, 60. BSMs 240, 250, 260 also each include means for learning and storing in a memory means their own port identifier as well as the MAC addresses of stations active on their respective LAN segments 40, 50, 60.

Figure 3:
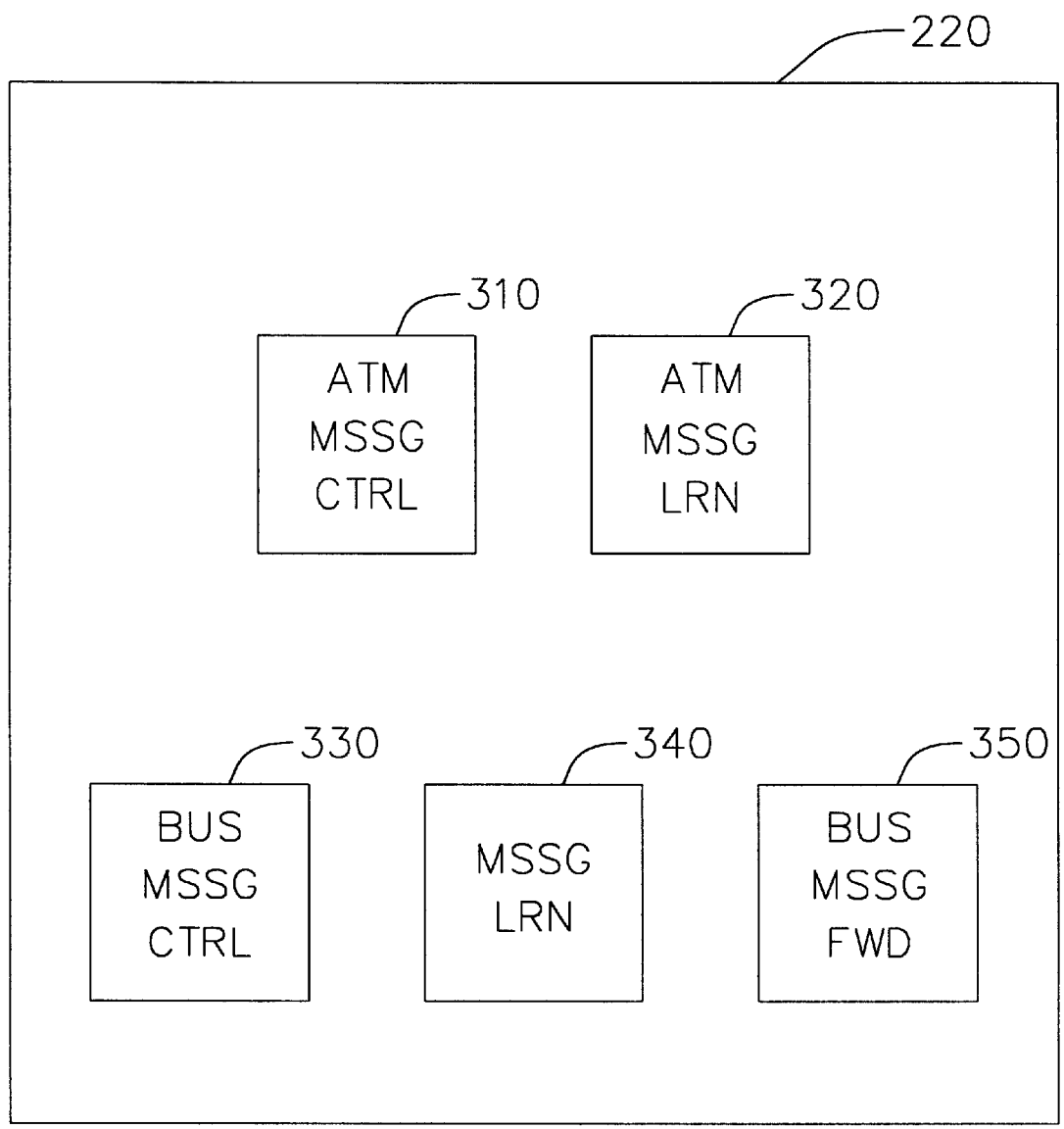
FIG. 3 is a functional diagram of ATM switching module (ASM) operating in accordance with the present invention.

ASM 220 has a port interfacing with the switching link 270 and a port interfacing with the ATM cloud 90. Turning to FIG. 3, a functional diagram of ASM 220 is provided. ASM 220 includes a ATM MSSG CTRL means 310. Means 310 serves to identify, filter and format messages received over switching link 270 before the messages are forwarded over ATM cloud 90. Means 310 includes means for identifying and retrieving the port identifier and LAN media type encoded in a message. Means 310 further includes means for determining from port records if the port identifier is associated with a VLAN active on ASM 220. A working copy of port records is preferably stored in hardware on ASM 220. Means 310 also includes means for retrieving the VCS identifier and VLAN identifier from port records through association with the port identifier. A working copy of port records is preferably stored in hardware on ASM 220. VCS and VLAN association and retrieval operations can be performed implementing known memory access mechanisms in hardware or software. Means 310 also includes means for formatting messages to be forwarded to the ATM cloud 90. Although member 200 is illustrated with one port to ATM cloud 90 and three LAN segments 40, 50, 60 behind member 200, a particular VCS instance member may provide seamless communication services over one or more ATM ports for one or more stations on one or more LAN segments behind the member. ASM 220 also includes a ATM MSSG FWD means 320. Means 320 serves to identify and forward messages received over the switching link 270 to the ATM cloud 90 along virtual circuit. Means 320 includes means for identifying the destination MAC address encoded in a message received over the switching link 270. Means 320 also includes means for retrieving from a learning table a virtual circuit identifier associated with a known unicast destination MAC addresses encoded in a message. Means 320 her includes means for retrieving from a "broadcast out" table a virtual circuit identifier for a "broadcast out" virtual circuit associated with a broadcast, multicast or unknown unicast destination MAC address encoded in a message. Additionally, means 320 includes means for retrieving from a member table the virtual circuit identifiers for "direct" virtual circuits to other members 100, 300 for a message encoded with broadcast, muiticast or unknown unicast destination MAC addresses. Learning table is preferably stored in hardware on ASM 220. "Broadcast out" and member tables are preferably stored in hardware on MPM 230 and updated on ASM 220. Retrieval of virtual circuit identifiers from the tables can be performed implementing known memory access mechanisms in hardware or software. A content addressable memory (CAM) look-up operation is contemplated for retrieving virtual circuit identifiers from the learning table. Means 320 also includes means for formatting a message and for forwarding a message over the ATM cloud 90 along one or more virtual circuits associated with one or more retrieved virtual circuit identifiers.

ASM 220 further includes a BUS MSSG CTRL means 330. Means 330 serves to filter-out messages received by member 200 over the ATM cloud 90 which are not associated with any VCS instance to which member 200 belongs. Means 330 includes a means for retrieving a virtual circuit identifier encoded in a message received over the ATM cloud 90. Means 330 also includes a means for determining if a virtual circuit identifier encoded in a received message is stored in a member table. The determination can be performed in hardware or software using a look-up operation in a known memory access mechanism.

BUS MSSG CTRL means 330 also serves to filter-out messages received by member 200 over the ATM cloud 90 which are not associated with any VLAN to which any BSM active on member 200 belongs. Means 330 includes a means for retrieving a VLAN identifier encoded in a message received over the ATM cloud 90. Means 330 also includes a means for determining if a VLAN identifier encoded in a received message is stored in port records. The determination can be performed in hardware or software using a look-up operation in a known memory access mechanism.

ASM 220 further includes MSSG LRN means 340. Means 340 serves to associate an address of a station (e.g., $ES_1$) behind another member (e.g., 100) with a "direct" virtual circuit to the other member. Means 340 includes a means for retrieving a source address and a virtual circuit identifier encoded in a message received over the ATM cloud 90. Means 340 also includes a means for determining if a source address is stored in a learning table. Means 340 also includes a means, upon determining that a source address is riot stored, for retrieving from a member table a virtual circuit identifier for a "direct" virtual circuit to the member in front of the station from which a message is received, by an association with a "broadcast in" virtual circuit identifier encoded in a received message. Means 340 farther includes a means for storing in a learning table, as a related pair, a source address of a received message and a "direct" virtual circuit identifier retrieved from a member table.

Additionally, ASM 220 includes BUS MSSG FWD means 350. Means 350 serves to format and forward messages received from the ATM cloud 90 (and associated with an active VCS instance and VLAN) over switching link 270. Means 350 includes a means for formatting a message in a manner sufficient to enable BSMs 240, 250, 260, upon receiving the message over switching link 270, to locate and recognize the destination MAC address encoded in the message.

Members 100, 300 are preferably peers of member 200 with equivalent components and functionality, except that one member may be selected as a master member for purposes of VCS instance configuration as will be discussed below in greater detail. Accordingly, to avoid unnecessary duplication, the components and functionality of members 100, 300 will not be detailed.

Figure 4:
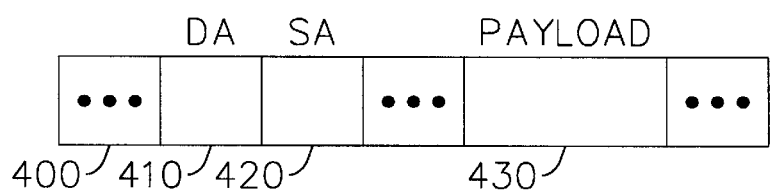
FIG. 4 shows the general format of a message originated by a station on a LAN segment.

Referring to FIG. 4, the general format of a message 400 originated by a station (e.g., $ES_2$) on a LAN segment (e.g., 40) is shown. Message 400 has a destination address field 410 followed by a source address field 420. Message 400 also has a payload 430. Source address field 420 is encoded with a MAC address assigned to the station which originated the message 400. The destination address field 420 may contain a broadcast, multicast or unicast address, depending on the intended destination of message 400. Payload 430 contains information for use by the intended destination station.

Figure 5:
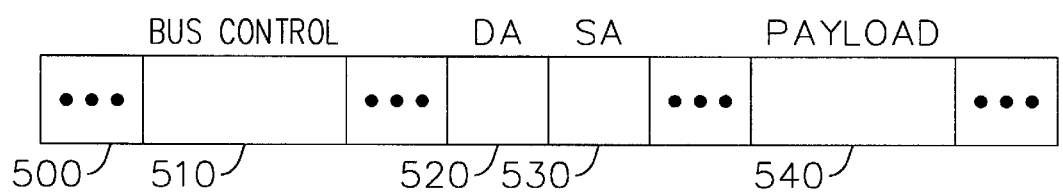
FIG. 5 shows the general format of a message generated by a basic switching module (SM) in response to a message generated on a LAN segment.

FIG. 5 shows the general format of a message 500 generated by a BSM (e.g., 240) in response to message 400. Message 500 has bus control fields 510 which include a port field encoded with a port identifier assigned to the BSM, an address expectation field encoded with a representation of the intended destination address which will be recognized globally by other BSMs (e.g., 250, 260) and ASM (e.g., 220) which receive message 500 over a switching link (e.g., 270) and a media type field encoded with an identifier indicating the LAN media format of the LAN segment (e.g., 40) on which message 400 originated. The globally recognized representation of MAC addresses encoded in address expectation field is preferably "canonical", i.e., least significant bit first (LSB). Message 500 also includes a destination address field 520, a source address field 530 and a payload 540 encoded with the same contents as their counterpart fields in message 400.

Figure 6:
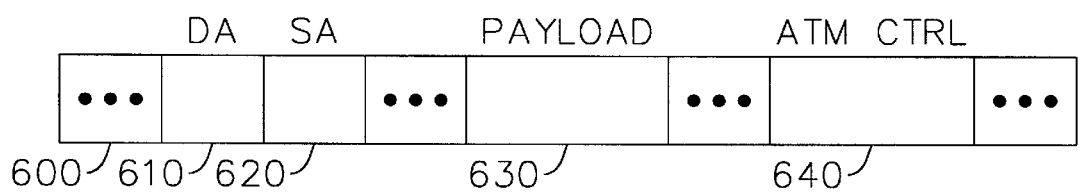
FIG. 6 shows the general format of a message generated by an ASM operating in accordance with the present invention in response to a message generated by a BSM.

FIG. 6 shows the general format of a message 600 generated by an ASM (e.g., 220) in response to message 500. Message 600 has a destination address field 610, a source address field 620 and a payload 630 encoded with the same contents as their counterpart fields in message 500. In addition, message 600 has ATM control fields 640. ATM control fields 640 include a VLAN identifier field encoded with the VLAN identifier of the BSM (e.g., 240) from which the message 600 was received, a media type field encoded with an identifier indicating the LAN media format of the LAN segment (e.g., 40) on which message 400 originated. It will be appreciated that ATM control fields 640 may include other fields, such as a cyclical redundancy check (CRC) field encoded with information sufficient to enable an edge device (e.g., 100) to which a counterpart of message 600 will be forwarded over an ATM network to determine whether the message transmission was error-free.

Figure 7:
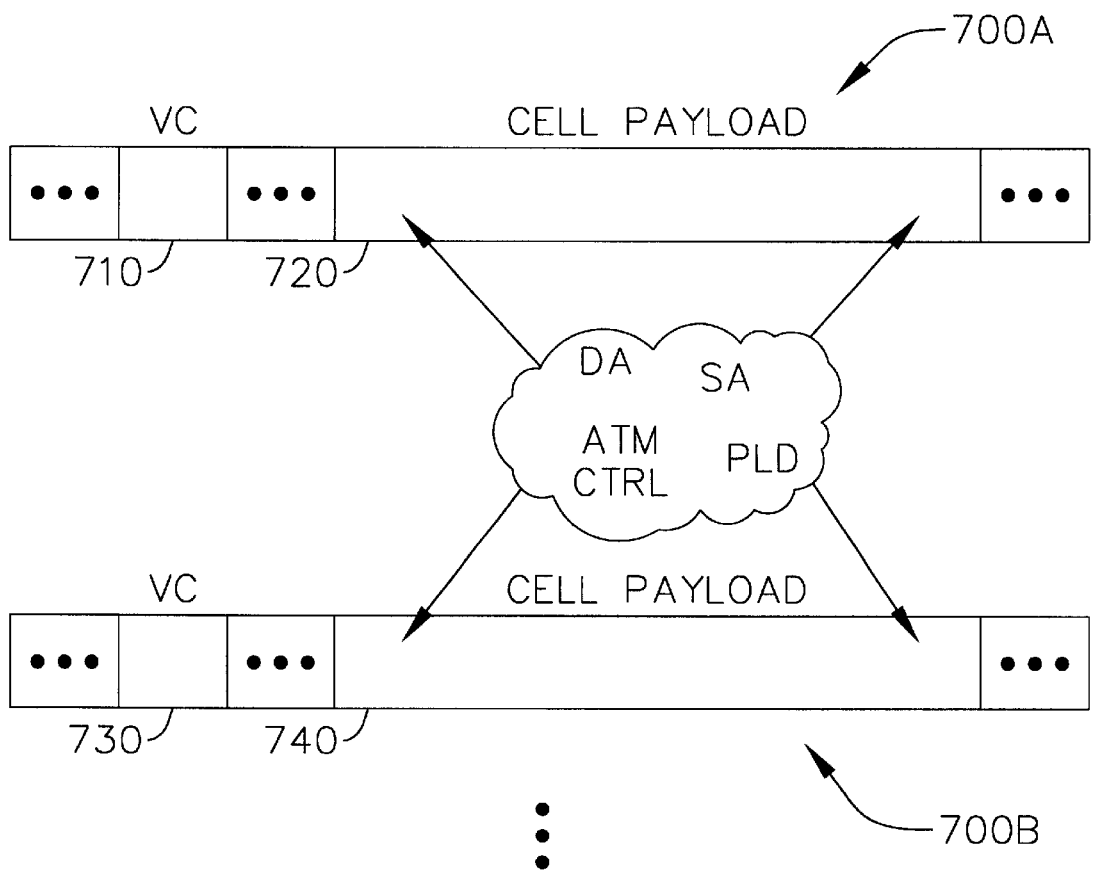
FIG. 7 shows the general format of a series of ATM cells generated by an ASM operating in accordance with the present invention for forwarding over an ATM cloud.

FIG. 7 shows the general format of ATM cells generated by an ASM (e.g., 220) for forwarding message 600 over an ATM network. Each cell has a length of 53 bytes. The cells 700A, 700B, etc. each include a virtual circuit field 710, 730, etc. for encoding with a virtual circuit identifier. Virtual circuit fields 710, 730, etc. may be sub-divided into a virtual circuit (VCCI) field and a separate virtual path (VPI) field. Cells 700A, 700B, etc. further each include a cell payload 720, 740, etc. Cell payloads 720, 740, etc. collectively include contents of message 600, including destination address, source address, VLAN identifier, LAN media type and information for use by the intended destination station. Subsequent cells (not shown) may be required to encode the entire contents of message 600. In that event, subsequent cells also include virtual circuit field and a cell payload in the same general format as cells 700A, 700B.

Figure 8:
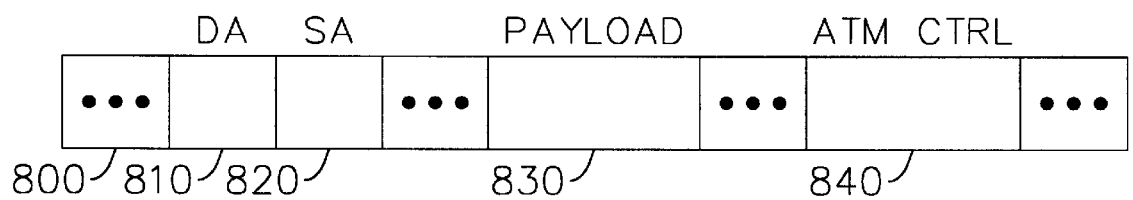
FIG. 8 shows the general format of a message reassembled by an ASM operating in accordance with the present invention from a series of ATM cells received over an ATM cloud.

FIG. 8 shows the general format of a message 800 reassembled by an ASM (e.g., 220) from a series of ATM cells 700A, 700B, etc. Message 800 has a destination address field 810, a source address field 820 and a payload 830 encoded with the same contents as their counterpart fields in message 600. In addition, message 800 has an ATM control fields 840. ATM control fields 840 include a VLAN identifier field encoded with the VLAN identifier of the BSM (e.g., 240) from which message 500 originated and a media type field encoded with an identifier indicating the LAN media format of the LAN segment (e.g., 40) on which message 400 originated.

Figure 9:
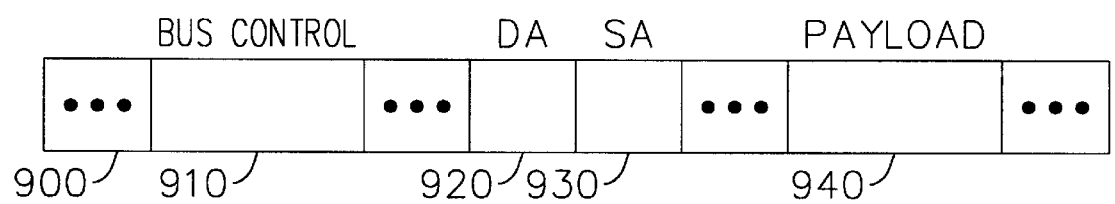
FIG. 9 shows the general format of a message generated by an ASM operating in accordance with the present invention in response to a message received over an ATM cloud.

FIG. 9 shows the general format of a message 900 generated by an ASM (e.g., 120) in response to message 800. Message 900 has bus control fields 910 which include a port field encoded with a port identifier of the ASM (e.g. 120) generating message 900, an address expectation field encoded with a representation of the intended destination address in a format which will be recognized globally by the BSMs (e.g., 140, 150, 160) behind the ASM which receive message 900 over a switching link (e.g., 170), and a media type field encoded with an identifier indicating the LAN media format of the LAN segment (e.g., 40) on which message 400 originated. Message 900 also includes a destination address field 920, a source address field 930 and a payload 940 encoded with the same contents as their counterpart fields in message 800.

Figure 10:
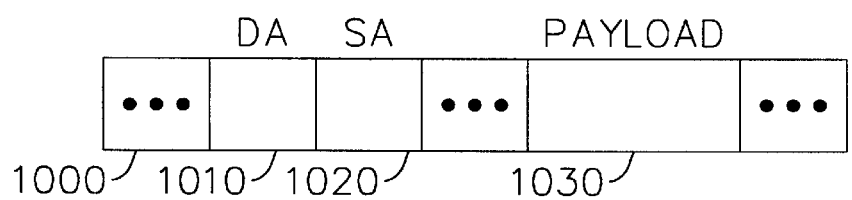
FIG. 10 shows the general format of a message generated by a BSM in response to a message generated by an ASM.
Figure 11:
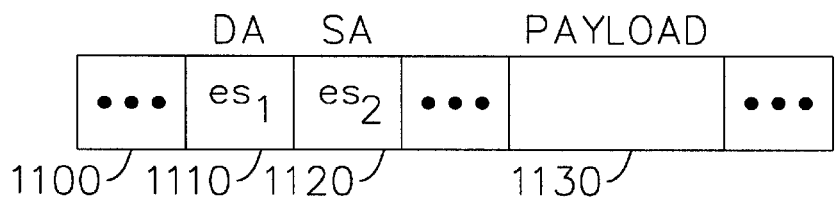
FIGS. 11 through 17 show the contents of a succession of exemplary messages for forwarding over an ATM cloud in accordance with the present invention on a point-to-multipoint "broadcast out" virtual circuit.
Figure 12:
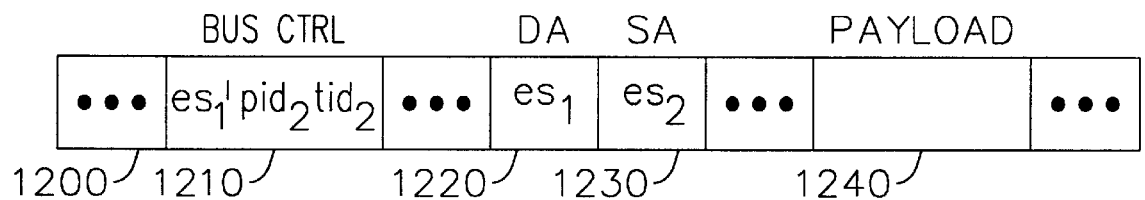
Figure 13:
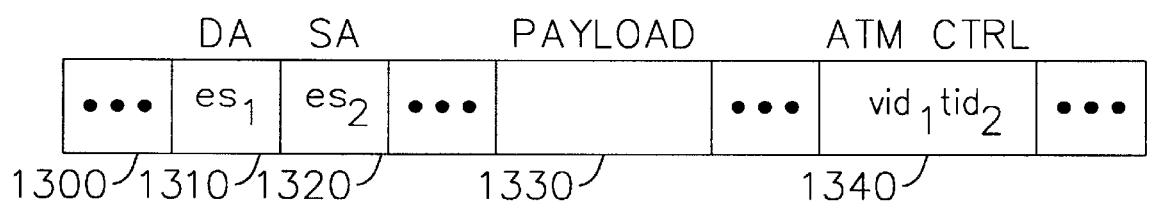
Figure 14:
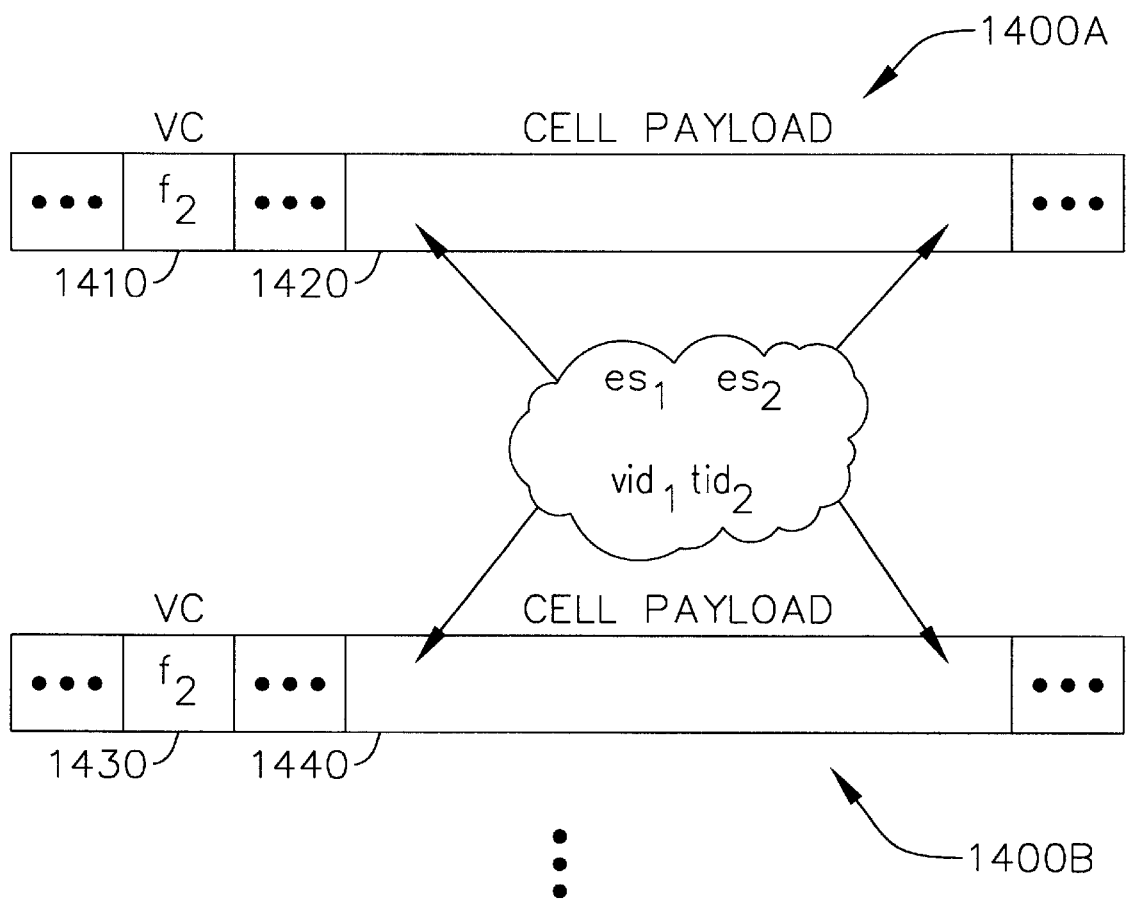
Figure 15:
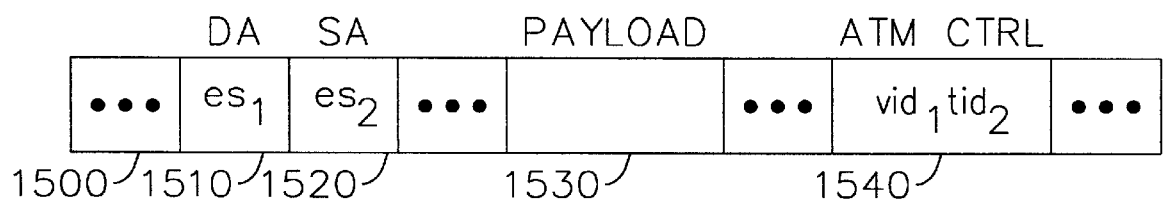
Figure 16:
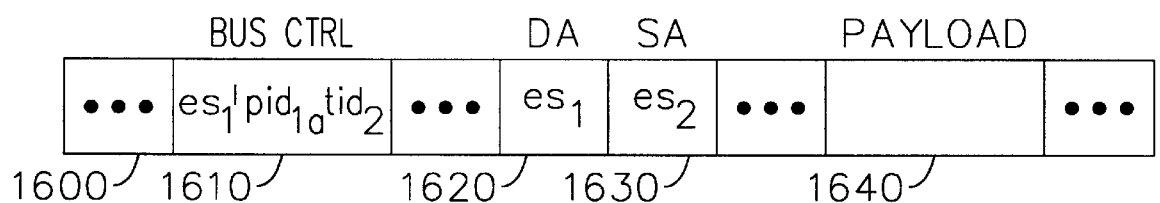
Figure 17:
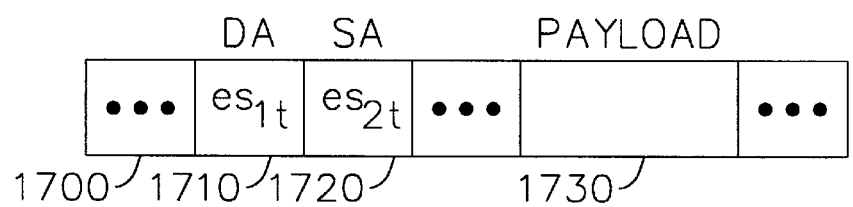
Figure 18:
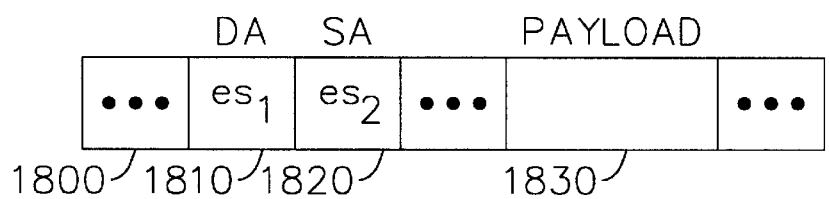
FIGS. 18 through 22 show the contents of a succession of exemplary messages for forwarding over an ATM cloud in accordance with the present invention on a plurality of point-to-point "direct" virtual circuits.
Figure 19:
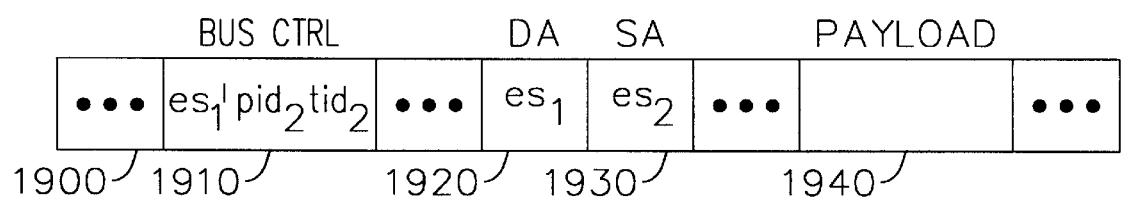
Figure 20:
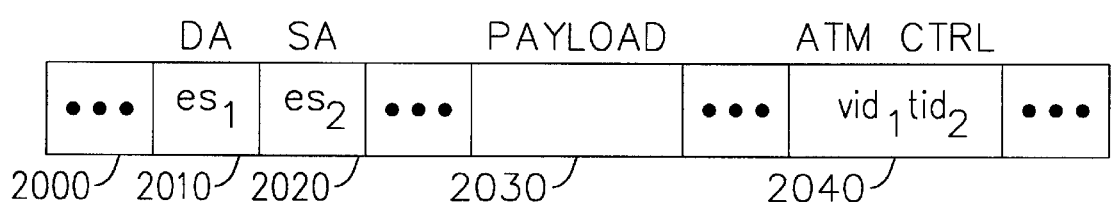
Figure 21:
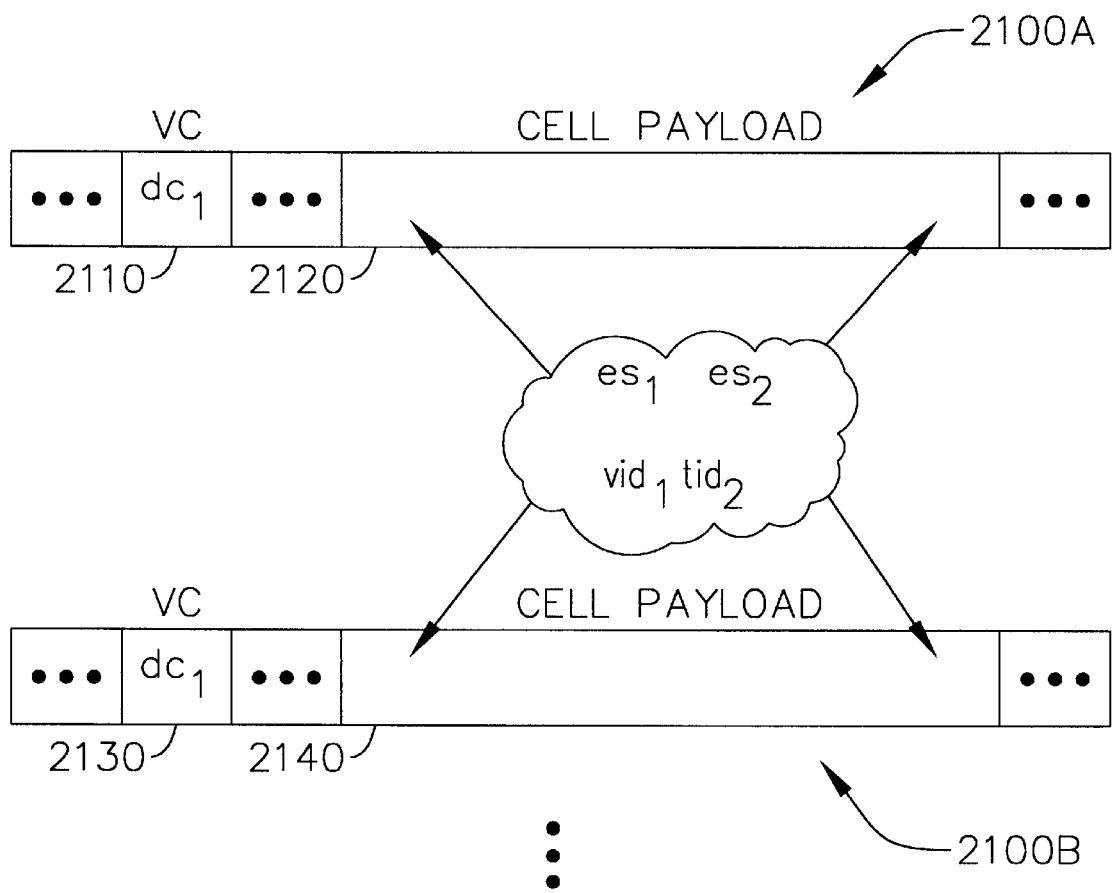
Figure 22:
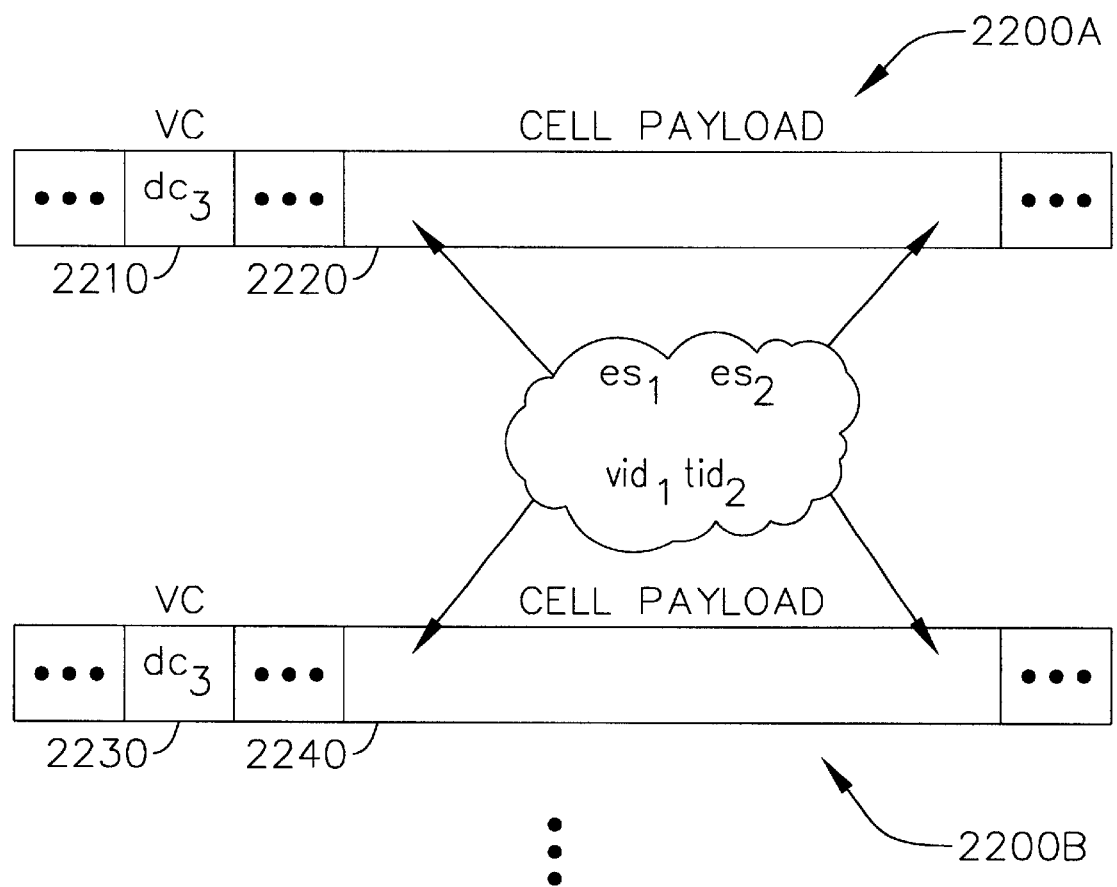
Figure 23:
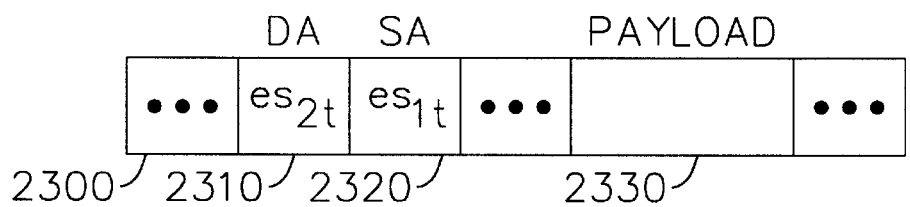
FIGS. 23 through 26 show the contents of a succession of exemplary messages for forwarding over an ATM cloud in accordance with the present invention on a point-to-point "direct" virtual circuit.
Figure 24:
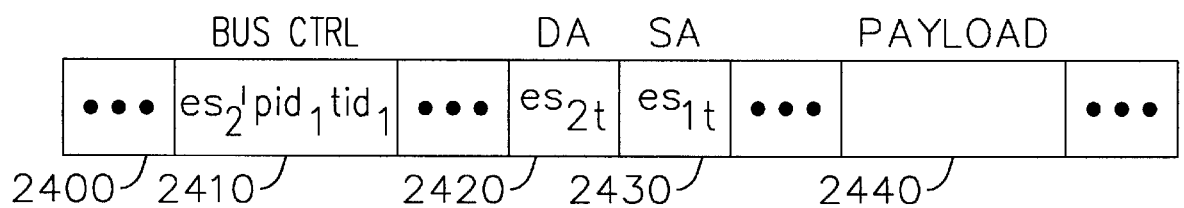
Figure 25:
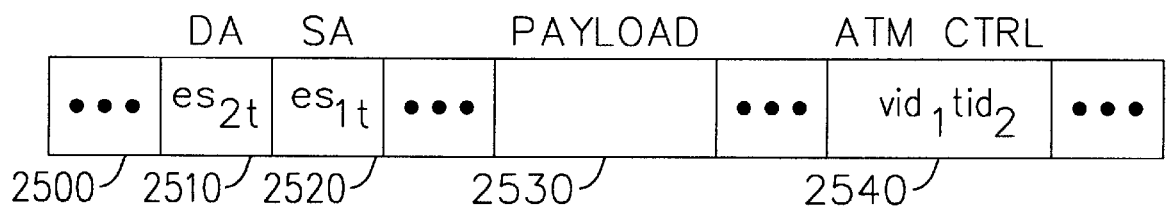
Figure 26:
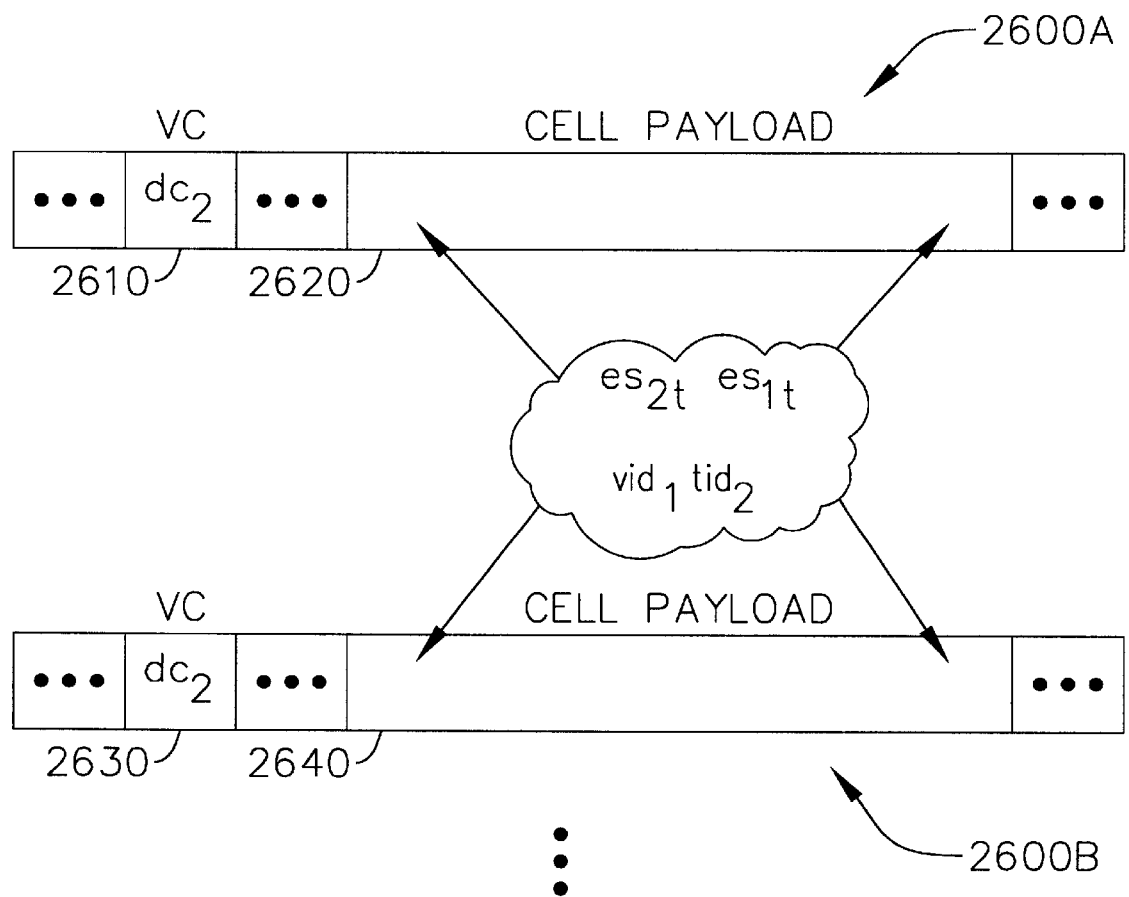

FIG. 10 shows the general format of a message 1000 for forwarding on a LAN segment (e.g., 4) originated by a BSM (e.g., 140) in response to message 900. Message 1000 has a destination address field 1010 followed by a source address field 1020. Message 1000 also has a payload 1030. Source address field 1020 is encoded with a MAC address assigned to the station which originated message 400. The destination address field 1020 may contain a broadcast, multicast or unicast address, depending on the intended destination of message 1000. Payload 1030 contains the information for use by the intended destination station.

In a preferred embodiment of the present invention, seamless communication over ATM cloud 90 is achieved in three steps: VCS instance configuration, message forwarding and address learning. VCS instance configuration is performed once on each member at the inception of the seamless interconnection service instance. Address learning is performed once for each station behind each member. Naturally, message forwarding is performed on each message sent over the ATM cloud 90.

In a preferred VCS instance configuration step, virtual circuits are configured between each member of the VCS instance by constructing a member table and a "broadcast out" table on each member. The "broadcast out" table preferably includes one entry for the VCS instance which associates all other members with a single virtual circuit identifier for a point-to-multipoint "broadcast out" virtual circuit to be used for forwarding messages to all other members. The member table preferably contains two table entries for every other member. The first entry associates the other member with a virtual circuit identifier for a "direct" virtual circuit to be used both in forwarding messages to the other member and identifying messages received from the other member. The second entry associates the other member with a virtual circuit identifier for a "broadcast in" virtual circuit to be used to identify messages received from the other member which were forwarded on a "broadcast out" virtual circuit. The "direct" virtual circuit and "broadcast in" virtual circuit identifiers are stored in the member table as related pairs. "Direct" and "broadcast in" virtual circuit identifiers are deliberately chosen so that members receiving messages over the ATM cloud 90 will have sufficient information, through an association operation using member table, to identify incoming messages encoded with particular virtual circuit identifiers as having been forwarded by a particular forwarding member. Thus, for instance, if member 100 of VCS instance $vcs_1$, selects virtual circuit identifier x as its "broadcast out" virtual circuit identifier for VCS instance $vcs_1$, member 200 of VCS instance $vcs_1$ must select a "broadcast in" virtual circuit identifier for member 100 which is a downstream counterpart of x. Similarly, if member 100 selects virtual circuit identifier y as its "direct" virtual circuit identifier for member 200, member 200 must select a "direct" virtual circuit identifier for member 100 which is the downstream counterpart of y. However, it will be appreciated that the "broadcast in" virtual circuit identifier selected by member 200 is not necessarily x (and the "direct" virtual circuit identifier selected by member 200 is not necessarily y) because the virtual circuit identifiers used in ATM networks are a local matter which may, if so configured, change between "hops" a message is forwarded over the network.

In a more preferred VCS instance configuration step, the seamless communication service just described is self-configuring. A single edge device 200 is selected as the master member for purposes of VCS instance configuration only. Other edge devices 100, 300 which are to belong to the same VCS instance configure a virtual circuit to master member 200 using a supplied ATM address of master member 200 and wellknown ATM signalling procedures. Edge devices 100, 300 forward messages containing their own ATM addresses to master member 200 along the virtual circuit. Master member 200 configures virtual circuits to other members 100, 300 using their advertised ATM addresses and well-known ATM signalling procedures and constructs member and "broadcast out" tables associating the other members 100, 300 with "broadcast out", "direct" and "broadcast in" virtual circuits to be used in forwarding messages to other members and identifying messages received from other members. Member 200 forwards one or more messages to the other members 100, 300 containing the ATM addresses of all active members of the VCS instance along either the "broadcast out" virtual circuit or the "direct" virtual circuits. The members 100, 300 use the ATM addresses supplied by the master member 200 and well-known ATM signalling procedures to construct a member and "broadcast out" tables associating the other members with "broadcast out", "direct" and "broadcast in" virtual circuits. Members 100, 300 also preferably send out periodic "keep alive" messages advising master member 200 of their continued membership in the VCS instance. Master member 200 responds to "keep alive" messages by forwarding a membership update message to other active members 100, 300.

A preferred message forwarding step for an exemplary unknown unicast message forwarded on a point-to-multipoint "broadcast out" virtual circuit over ATM cloud 90 of FIG. 1 is illustrated by reference to FIGS. 10 through 17. It is assumed for purposes of this example that BSM 240 in front of source station $ES_2$ belongs to VCS instance $vcs_1$; that "broadcast out" virtual circuit for VCS instance $vcs_1$, is configured on member 200; that station $ES_2$ communicates on a type "two" LAN media $tid_2$ (e.g., Ethernet); that station $ES_1$ communicates on a type "one" LAN media $tid_1$ (e.g., Token Ring), which is different from type "two"; and that VLAN $vid_1$, is active on BSM 240, 140 and on ASMs 220, 120.

Initially, station $ES_2$ on LAN segment 40 originates message 1100. Message 1100 includes a destination address field 1110, a source address field 1120 and a payload 1130. Destination address field 1110 is encoded by station $ES_2$ with destination address $es_1$, which is a MAC address uniquely assigned to destination station $ES_1$ behind member 100. Source address field 1120 is encoded with address $es_2$, which is a MAC address of source station $ES_2$ behind member 200. Payload 1130 includes information for use by the intended destination station $ES_1$. Message 1100 arrives at BSM 240 due to the broadcast nature of the LAN segment 40 shared by the station $ES_2$ and BSM 240 and is captured by BSM 240.

In response to message 1100, member 200 generates message 1200 on BSM 240. Message 1200 has bus control fields 1210, destination address field 1220, source address field 1230 and payload 1240. Bus control fields 1210 include a port field encoded with port identifier $pid_2$ assigned to BSM 240, an address expectation field encoded with $es_1$, which is a representation of destination addresses, which will be recognized globally-by BSMs 250, 260 and ASM 220, e.g., a "canonical" representation of address $es_1$, and a media type field encoded with an identifier $tid_2$, which is an identifier indicating the LAN media type of source LAN segment 40. Payload 1240 is encoded with the same contents as payload 1130. Member 200 forwards message 1200 on the switching link 270. Message 1200 arrives at BSMs 250, 260 and ASM 220 due to the broadcast nature of the switching link 270. ASM 220 captures message 1200 from switching link 270.

At ASM 220, port identifier $pid_2$ is retrieved from message 1200. Using port identifier $pid_2$, it is determined from port records that ASM 220 and BSM 240 share a common VLAN identified by VLAN identifier $vid_1$. Because ASM 220 and BSM 240 share a common VLAN, ASM 220 captures message 1200. Member 200 retrieves the VCS instance $vcs_1$ associated with message 1200 from the port records through an association with port identifier $pid_2$. Member 200 also looks-up the destination MAC address $es_1'$ encoded in message 1200 in the learning table for VCS instance $vcs_1$ to determine if the address has been learned, i.e., has already been associated with a "direct" point-to-point virtual circuit to another member of the VCS instance. Because no match is found, the destination address $es_1'$ has not been learned. Thus, the "broadcast out" table for VCS instance $vcs_1$ is consulted. The "broadcast out" virtual circuit identifier $f_2$ associated with a "broadcast out" virtual circuit for other members 100, 300 of VCS instance $vcs_1$ is retrieved from the "broadcast out" table.

In response to message 1200, member 200 generates message 1300. Message 1300 includes destination address field 1310 and source address field 1320 encoded with destination address $es_1$ and source address $es_2$, respectively. Message 1300 also includes payload 1330 having the same contents as payload 1240. Message 1300 also contains ATM control fields 1340 including a VLAN field and a media type field. VLAN field is encoded with VLAN identifier $vid_1$ retrieved from port records. Type field is encoded with identifier $tid_2$ retrieved from message 1200.

The message 1300 is segmented into a series of 53 byte cells 1400A, 1400B, etc. for forwarding over the ATM cloud 90. The cells 1400A, 1400B, etc. each include a virtual circuit field 1410, 1430, etc. and a cell payload field 1420, 1440, etc. Virtual circuit fields 1410, 1430, etc. are each encoded with virtual circuit identifier $f_2$ retrieved from the "broadcast out" table. Cell payloads 1420, 1440, etc. collectively are encoded with destination and source addresses $es_1$ and $es_2$, respectively, VLAN identifier $vid_1$, source LAN media identifier $tid_2$ and payload consisting of the information for use at intended destination station $ES_1$. It will be appreciated that such addresses, identifiers, and information will be encoded only once, but may be encoded in the first cell 1400A, the second cell 1400B, or a subsequent cell. Subsequent cells (not shown) are generated in the same general format as cells 1400A, 1400B, etc. as required to encode the entire contents of message 1300.

Member 200 forwards cells 1400A, 1400B, etc., over the ATM cloud 90 to other members 100, 300 on the point-to-multipoint "broadcast out" virtual circuit associated with virtual circuit identifier $f_2$. Forwarding over ATM cloud 90 is accomplished hop-by-hop by conventional ATM switching means. ATM switches in the ATM cloud 90 implement rules such as "send any cell received on port x with a virtual circuit identifier $f_2$ on output port y with virtual circuit identifier $f_2'$." The forwarding operation is repeated at each hop until all cells arrive at the other members 100, 300 of the VCS instance $vcs_1$. When the cells arrive at members 100, 300, the cells may have encoded a different virtual circuit identifier (e.g., $f_2'$) which is the downstream counterpart of $f_2$, but are in relevant respects the same as cells 1400A, 1400B, etc. which were forwarded by member 200 over ATM cloud 90. To avoid unnecessary complication, it will be assumed that the cells 1400A, 1400B, etc. arrive at members 100, 300 encoded with the same virtual circuit identifier $f_2$ encoded in the cells 1400A, 1400B, etc. by member 200 prior to forwarding.

Upon arrival at members 100, 300, cells 1400A, 1400B, etc. are processed. Processing will be discussed only in relation to member 100, although member 300 will undertake similar processing steps so long as message processing is required. Member 100 retrieves the virtual circuit identifier $f_2$ from the cells and determines if it is stored as an entry in the member table. As a result of the configuration step, the virtual circuit identifier $f_2$ is located in the member table, so that cells 1400A, 1400B, etc. are recognized as having been forwarded by a member of a VCS instance to which member 100 belongs. Processing of cells 1400A, 1400B, etc. is therefore allowed to continue. If virtual circuit identifier $f_2$ had not been found, cells 1400A, 1400B, etc. would have been dropped without further processing.

At ASM 120, member 100 reassembles cells 1400A, 1400B, etc. into a single message 1500 having the same form and content as message 1300. Thus, message 1500 includes destination address field 1510 and source address field 1520 encoded with destination address $es_1$ and source address $es_2$, respectively. Message 1500 also includes payload 1530 having the same contents as payload 1330. Message 1500 also contains ATM control fields 1540 including VLAN field and media type field. VLAN field is encoded with VLAN identifier $vid_1$ and type field is encoded with identifier $tid_2$.

Member 100 determines if the VLAN identifier $vid_1$ encoded in message 1500 is stored as an entry in port records. Because VLAN identifier $vid_1$ is active on ASM 120, VLAN identifier $vid_1$ is located in port-records. Processing of message 1500 is therefore allowed to continue. If VLAN identifier $vid_1$ had not been found, message 1500 would have been dropped without further processing.

In a preferred address learning step for an unknown unicast message forwarded on a point-to-multipoint "broadcast out" virtual circuit, member 100 retrieves the source address $es_2$ and the media type $tid_2$ encoded in message 1500. Member 100 generates an address $es_1$ which is the globally recognized representation of source address $es_2$. Member 100 determines whether address $es_2'$ is stored in the learning table. Because no match is found, address $es_2'$ will have to be learned by member 100 before forwarding, i.e., address es will have to be associated with a "direct" virtual circuit over the ATM cloud 90 to member 200. Member 100 looks-up virtual circuit identifier $f_2$ in member table. As a result of the configuration step, virtual circuit identifier $f_2$ is found in the member table as a "broadcast in" virtual circuit associated with the "direct" virtual circuit for member 200 having a virtual circuit identifier $dc_2$. Member 100 retrieves "direct" virtual circuit identifier $dc_2$ from the member table and stores the address $es_2'$ and virtual circuit identifier $dc_2$ as a related pair in the learning table. The address learning step is thus complete and the message forwarding step resumes.

In resumption of the preferred message forwarding step, member 100 retrieves the port identifier $pid_{1a}$ of ASM 120 from the working copy of the port records. Member 100 generates message 1600 having bus control fields 1610, destination address field 1620, source address field 1630 and payload 1640. Bus control fields 1610 include sport field encoded with port identifier $pid_{1a}$ assigned to ASM 120, an address expectation field encoded with $es_1'$, which is the globally recognized representation of destination MAC address $es_1$, and a media type field encoded with source LAN media identifier $tid_2$. Naturally, payload 1640 is encoded with the same contents as payload 1530. Member 100 forwards message 1600 on switching link 170.

At BSM 140, port identifier $pid_{1a}$ is retrieved from message 1600. Using port identifier $pid_{1a}$ it is determined from port records that BSM 140 and ASM 140 share the common VLAN identified by VLAN identifier $vid_1$. Because ASM 120 and BSM 140 share a common VLAN, processing continues on BSM 140. Address $es_1'$ is looked-up in a memory means. Because a match is found, BSM 140 captures message 1600 from the switching link 170. BSM 140 translates message 1600 into type "one" LAN media expected by LAN segment 4, resulting in message 1700. Translation involves, at a minimum, changing the bit order of the addresses encoded in address fields 1620 and 1630 from "canonical" or least significant bit first (LSB) format to "non-canonical" or most significant bit first (MSB) format, or vice versa, depending on the translation to be performed. Where type "two" media is Ethernet and type "one" media is Token Ring, translation will be from LSB first to MSB first. Message 1700 includes a destination address field 1710, a source address field 1720 and a payload 1730. Destination address field 1710 is encoded with translated destination MAC address $es_{1'}$. Source address field 1720 is encoded with translated source MAC address $es_{2'}$. Payload 1730 is encoded with the same contents as payload 1640. Message 1700 is propagated on LAN segment 4. Station $ES_1$ captures message 1700 off LAN segment 4, completing seamless communication from station $ES_2$ to $ES_1$.

A preferred message forwarding step for an exemplary unknown unicast message to be forwarded on a plurality of point-to-point "direct" virtual circuits over the ATM cloud of FIG. 1 is illustrated by reference to FIGS. 18 through 22. In addition to the assumptions made in the prior example, it is assumed for purposes of this example that the "broadcast out" virtual circuit for VCS instance $vcs_1$ is not configured on member 200.

Initially, station $ES_2$ on LAN segment 40 originates message 1800. Message 1800 includes a destination address field 1810, a source address field 1820 and a payload 1830. Destination address field 1810 is encoded by station $ES_2$ with destination address $es_1$. Source address field 1820 is encoded with address $es_2$. Payload 1830 includes information for use by the intended destination station $ES_1$. Message 1800 arrives at BSM 240 due to the broadcast nature of the LAN segment 40 shared by the station $ES_2$ and BSM 240 and is captured by BSM 240.

In response to message 1800, member 200 generates message 1900. Message 1900 has bus control fields 1910, destination address field 1920, source address field 1930 and payload 1940. Bus control fields 1910 include a port field encoded with port identifier $pid_2$ assigned to BSM 240, an address expectation field encoded with $es_1'$, which is a globally recognized representation of destination address $es_1$, and a media type field encoded with an identifier $tid_2$, which is the identifier of the LAN media type of source LAN segment 40. Payload 1940 is encoded with the same contents as payload 1830. Member 200 forwards message 1900 on switching link 270.

At ASM 220, port identifier $pid_2$ is retrieved from message 1900. Using port identifier $pid_2$, it is determined from port records that ASM 220 and BSM 240 share a common VLAN identified by VLAN identifier $vid_1$. Because ASM 220 and BSM 240 share a common VLAN, ASM 220 captures message 1900. Member 200 retrieves the VCS instance $vcs_1$ associated with message 1900 from the port records through an association with port identifier $pid_2$. Member 200 also looks-up the destination MAC address $es_1'$ encoded in message 1900 in the learning table for VCS instance $vcs_1$ to determine if the address has been learned, i.e., has already been associated with a "direct" point-to-point virtual circuit to another member of the VCS instance. Because no match is found, the destination address $es_{1'}$ has not been learned. Thus, the "broadcast out" table for VCS instance $vcs_1$ is consulted. Because the "broadcast out" table is not configured, the member table of VCS instance $vcs_1$ is consulted. Member 200 retrieves from member table the virtual circuit identifiers $dc_1$ and $dc_3$ for "direct" virtual circuits to other members 100, 300. A copy of message 1900 is made so that one copy of message 1900 can be forwarded to each member 100, 300 on the retrieved "direct" virtual circuits.

In response to message 1900, member 200 generates two messages 2000. Messages 2000 each include destination address fields 2010 and source address fields 2020, respectively. Destination address fields 2010 are encoded with destination address $es_1$. Source address fields 2020 are encoded with source address $es_2$. Messages 2000 also include payload 2030 having the same contents as payloads 1940. Messages 2000 also contain ATM control fields 2040 including VLAN fields and media type fields. VLAN fields are encoded with VLAN identifier $vid_1$ and type fields are encoded with source LAN media identifier $tid_2$.

The first copy of message 2000 is segmented into a series of 53 byte cells 2100A, 2100B, etc. for forwarding over the ATM cloud 90 to member 100. The cells 2100A, 2100B, etc. each include a virtual circuit field 2110, 2130, etc. and a cell payload field 2120, 2140, etc. Virtual circuit fields 2110, 2130, etc. are each encoded with virtual circuit identifier $dc_1$ retrieved from the member table. Cell payloads 2120, 2140, etc. collectively are encoded with destination and source addresses $es_1$ and $es_2$, respectively, VLAN identifier $vid_1$, source LAN media identifier $tid_2$ and payload consisting of the information for use at intended destination station $ES_1$. Subsequent cells (not shown) are generated in the same general format as cells 2100A, 2100B, etc. as required to encode the entire contents of message 2000.

The second copy of message 2000 is segmented into a series of 53 byte cells 2200A, 2200B, etc. for forwarding over the ATM cloud 90 to member 300. The format and content of cells 2200A, 2200B, etc. is identical to their counterpart cells 2100A, 2100B, etc., respectfflly, except that the virtual circuit fields 2210, 2260, etc. are encoded with "direct" virtual circuit identifier $dc_3$ rather than "direct" virtual circuit identifier $dc_1$.

Member 200 forwards cells 2100A, 2100B, etc. over the ATM cloud 90 to member 100 on the point-to-point "direct" virtual circuit associated with virtual circuit identifier $dc_1$. Member 200 forwards cells 2200A, 2200B, etc. over the ATM cloud 90 to member 300 on the point-to-point "direct" virtual circuit associated with virtual circuit identifier $dc_3$. As in the prior example, forwarding over ATM cloud 90 is accomplished hop-by-hop by conventional ATM switching means. Again for simplicity, processing will only be discussed on member 100 and it will be assumed that cells 2100A and 2100B arriving at member 100 are encoded with virtual circuit identifier $dc_1$ rather than a downstream counterpart.

Member 100 retrieves the virtual circuit identifier $dc_1$ from the cells and determines if it is stored as an entry in the member table. As a result of the configuration step; the virtual circuit identifier $dc_1$ is located in the member table, so that cells 1400A, 1400B, etc. are recognized as having been forwarded by a member of a VCS instance to which member 100 belongs. Processing of cells 2100A, 2100B, etc. is therefore allowed to continue.

Member 100 reassembles cells 2100A, 2100B, etc. into a single message having the same form and content as message 2000. Member 100 determines if the VLAN identifier $vid_1$ encoded in reassembled message is stored as an entry in port records. Because VLAN identifier $vid_1$ is active on ASM 120, VLAN identifier $vid_1$ is located in port records. Processing of the reassembled message is therefore allowed to continue. If VLAN identifier $vid_1$ had not been found, the reassembled would have been dropped without further processing.

In a preferred address learning step for a unknown unicast message forwarded on a "direct" virtual circuit, member 100 retrieves the source address $es_2$ and the media type $tid_2$ encoded in the reassembled message. Member 100 generates an address $es_2'$, which is the globally recognized representation of source address $es_2$. Member 100 determines whether address $es_2'$ is stored in the learning table. Because no match is found, address $es_2'$ will have to be learned by member 100, i.e., address $es_2'$ will have to be associated with a "direct" virtual circuit over the ATM cloud 90 to member 200. Member 100 looks-up virtual circuit identifier $dc_1$ associated with the message forwarded by member 200 in its member table. As a result of the configuration step, virtual circuit identifier $dc_1$ is found in the member table as the identifier of a "direct" virtual circuit for-member 200 $dc_2$. Member 100 retrieves "direct" virtual circuit identifier de from the member table and stores the address $es_1'$ and virtual circuit identifier $dc_2$ as a related pair in the learning table. The address learning step is thus complete and forwarding to $ES_1$ continues in the manner discussed in the prior example.

Now consider a reply to message 1100 sent by station $ES_1$ to station $ES_2$. This situation is illustrated by reference to FIGS. 23 through 26. Because $es_1'$ has been learned on member 100, FIGS. 23 through 26 illustrate a preferred message forwarding and address learning step for an exemplary known unicast message forwarded on a point-to-point "direct" virtual circuit. Station $ES_1$ originates message 2300. Message 2300 includes a destination address field 2310, a source address field 2320 and a payload 2330. Destination address field 2310 is encoded by station $ES_1$ with address $es_{2l}$, which is the representation of the MAC address for intended destination station $ES_2$ recognized on LAN segment 4. Source address field 2320 is encoded with address, $es_{2l}$, which is the representation of the MAC address for source station $ES_1$ recognized on LAN segment 4. Payload 2330 includes information for use by the intended destination station $ES_2$. Message 2300 arrives at BSM 140 due to the broadcast nature of LAN segment 4. BSM 140 captures message 2300.

In response to message 2300, member 100 generates message 2400. Message 2400 has bus control fields 2410, destination address field 2420, source address field 2430 and payload 2440. Bus control fields 2410 includes a port field encoded with port identifier $pid_1$ assigned to BSM 140, an address expectation field encoded with $es_2'$, which is a globally recognized representation of destination address $es_2$, and a media type field encoded with an identifier $tid_1$, which is the identifier of the LAN media type of source LAN segment 4. Payload 2440 is encoded with the same contents as payload 2330. Member 100 forwards message 2400 on switching link 170.

At ASI 120, port identifier $pid_1$ is retrieved from message 2400. Using port identifier $pid_1$, it is determined from port records that ASM 120 and BSM 140 share a common VLAN identified by VLAN identifier $vid_1$. Because ASM 120 and BSM 140 share a common VLAN, ASM 120 captures message 2400. Member 100 retrieves the VCS instance $vcs_1$ associated with message 2400 from the port records through an association with port identifier $pid_1$. Member 100 also looks-up the destination MAC address es encoded in message 2400 in the learning table for VCS instance $vcs_1$ to determine if the address has been learned, i.e., has already been associated with a "direct"point-to-point virtual circuit to another member of the VCS instance. Because a match is found, the MAC representation $es_2'$ has been learned. Thus, the "direct" virtual circuit identifier $dc_2$ associated with a "direct" virtual circuit to member 200 is retrieved from the learning table. It will be appreciated that if address $es_2$ had not been stored in globally recognized format $es_2'$, a match would not have been found because stations $ES_2$ and $ES_1$ generate addresses in disparate LAN media formats.

In response to message 2400, member 100 generates message 2500. Message 2500 includes destination address field 2510 and source address field 2520 encoded with destination address $es_{2l}$ and source address $es_{1l}$, respectively. Message 2500 also includes payload 2530 having the same contents as payload 2440. Message 2500 also contains ATM control fields 2540 including VLAN field and media type field. VLAN field is encoded with VLAN identifier $vid_1$ and type field is encoded with identifier $tid_1$.

Message 2500 is segmented into a series of 53 byte cells 2600A, 2600B, etc. for forwarding over the ATM cloud 90 to member 200. The cells 2600A, 2600B, etc. each include a virtual circuit field 2610, 2630, etc. and a cell payload field 2620, 2640, etc. Virtual circuit fields 2610, 2630, etc. are each encoded with virtual circuit identifier $dc_2$ retrieved from the member table. Cell payloads 2620, 2640, etc. collectively are encoded with destination and source addresses $es_2$ and $es_1$, respectively, VLAN identifier $vid_1$, source LAN media identifier $tid_1$ and payload consisting of the information for use at intended destination station $ES_2$. Subsequent cells (not shown) are generated in the same general format as cells 2600A, 2600B, etc. as required to encode the entire contents of message 2500.

Member 100 forwards cells 2600A, 2600B, etc. over the ATM cloud 90 to member 200 on the point-to-point "direct" virtual circuit associated with virtual circuit identifier $dc_2$. As in the prior examples, forwarding over ATM cloud 90 is accomplished hop-by-hop by conventional switching means and it will be assumed for simplicity that cells 2600A, 2600B, etc. arriving at member 200 are encoded with virtual circuit identifier $dc_1$ rather than a downstream counterpart.

Member 200 retrieves the virtual circuit identifier $dc_2$ from the cells and determines if it is stored as an entry in the member table. As a result of the configuration step, the virtual circuit identifier $dc_2$ is located in the member table, so that cells 2600A, 2600B, etc. are recognized as having been forwarded by a member of a VCS instance to which member 200 belongs. Processing of cells 2600A, 2600B, etc. is therefore allowed to continue.

Member 200 reassembles cells 2600A, 2600B, etc. into a single message having the same form and content as message 2500. Member 200 determines if the VLAN identifier $vid_1$ encoded in reassembled message is stored as an entry in port records. Because VLAN identifier $vid_1$ is active on ASM 220, VLAN identifier $vid_1$ is located in port records. Processing of the reassembled message is therefore allowed to continue. If VLAN identifier $vid_1$ had not been found, the reassembled would have been dropped without further processing.

In a preferred address learning step for a known unicast message forwarded on a "direct" virtual circuit, member 200 retrieves the source address $es_{1l}$ and the media type $tid_1$ encoded in the reassembled message. Member 200 generates an address $es_1'$, which is the globally recognized representation of source address $es_1$. Member 200 determines whether address es₁' is stored in the learning table. Because no match is found, address es₁' will have to be learned by member 200, i.e., address es₁' will have to be associated with a "direct" virtual circuit over the ATM cloud 90 to member 100. Member 200 looks-up virtual circuit identifier dc₂ associated with the reassembled message in its member table. As a result of the configuration step, virtual circuit identifier dc is found in the member table as the identifier of a "direct" virtual circuit dc₁ for member 100. Member 200 retrieves "direct" virtual circuit identifier dc₁ from the member table and stores the address es₁' and virtual circuit identifier dc₁ as a related pair in its learning table. The address learning step is thus complete and forwarding to ES₂ continues in the manner discussed in the prior examples.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and s all changes that come within the meaning and range of-equivalents thereof are intended to be embraced therein.

We claim:

1. A service for providing seamless communication over an ATM network, comprising:

n devices at the edge of said ATM network, where n is an integer greater than two, said devices interconnecting stations behind said devices to said ATM network;

means internal to each of the n devices for storing a circuit identifier of a virtual circuit for forwarding broadcast multicast, and unknown unicast messages to other n−1 devices;

means internal to a first of said devices for receiving a data message originated by a station behind said first device, said data message containing a source address of said originating station and a destination address of a station behind a second of said devices;

means internal to said first device for resolving said destination address to a virtual circuit over said ATM network to said second device; and means internal to said first device for forwarding said data message along said virtual circuit.

2. The service of claim 1, wherein said data message contains a virtual local area network identifier, and wherein said service further comprises:

means internal to said second device for receiving said data message sent along said virtual circuit;

means internal to said second device for comparing said identifier contained in said data message with a group of virtual local area network identifiers assigned to said second device; and means internal to said second device for filtering said data message if said identifier contained in said data message is not within said group.

3. The service of claim 1, further comprising:

means internal to said second device for storing said address of said originating station and an identifier of said virtual circuit as a related pair.

4. The service of claim 3, wherein said storing means stores said address of said originating station in a predetermined bit order.

5. The service of claim 3, wherein said related pair is stored in hardware.

6. The service of claim 1, wherein at least one of said n devices is a member of k said seamless communication services, where k is an integer greater than one.

7. A service for providing seamless communication over an ATM network, comprising:

n devices at the edge of said ATM network, where n is an integer greater than two;

means internal to each of the n devices for storing a virtual circuit identifier of a virtual circuit for forwarding broadcast, multicast, and unknown unicast messages to other n−1 devices;

means for interconnecting one or more stations behind a first of said devices to said ATM network;

means internal to said first device for receiving a first data message originated by a first of said stations behind said first device, said first data message containing a destination address of a second of said stations behind said first device;

means internal to said first device for determining if a representation of said destination address is stored in a memory means in said first device;

upon determining that said representation is not stored in said memory means, means internal to said first device for associating said first data message with a point-to-multipoint forwarding virtual circuit over said ATM network to the other n−1 devices; and means internal to said first device for forwarding said message along said point-to-point forwarding virtual circuit.

8. The service of claim 7, further comprising:

means internal to said first device for receiving a second data message over said ATM network along a point-to-multipoint receiving virtual circuit, said second data message originated by a source station behind a source device and containing an address of said source station;

means internal to said first device for resolving said receiving virtual circuit to a point-to-point forwarding virtual circuit to said source device;

means internal to said first device for associating said point-to-point forwarding virtual circuit with a representation of said source station address; and means internal to said first device for storing said representation of said source station address and said point-to-point forwarding virtual circuit as a related pair.

9. The service of claim 8, further comprising:

means internal to said first device for comparing a virtual local area network identifier contained in said second data message received along said point-to-multipoint receiving virtual circuit with a group of virtual local area network identifiers assigned to said first device; and means internal to said first device for filtering said second data message if said identifier contained in said second data message is not within said group.

10. The service of claim 8, wherein said related pair is stored in hardware.

11. The service of claim 7, wherein said first device is a member of k said seamless communication services, where k is an integer greater than one.

12. A service for providing seamless communication over an ATM network, comprising:

n devices at the edge of said ATM network, where n is an integer greater than two;

means internal to each of the n devices for storing a virtual circuit identifier of a virtual circuit for forwarding broadcast, multicast, and unknown unicast messages to other n−1 devices;

means for interconnecting one or more stations behind a first of said devices to said ATM network;

means internal to said first device for receiving a first data message originated by a said station, said message containing an address;

means internal to said first device for determining if a representation of said address is stored in a memory means in said first device;

upon determining that said representation is not stored in said memory means, means internal to said first device for associating said message with n−1 point-to-point forwarding virtual circuits over said ATM network to the other n−1 devices; and means internal to said first device for forwarding said first data message along said point-to-point forwarding virtual circuits.

13. The service of claim 12, further comprising:

means internal to said first device for receiving a second data message over said ATM network along a point-to-point receiving virtual circuit, said message originated by a source station behind a source device and containing an address of said source station;

means internal to said first device for resolving said receiving virtual circuit to a point-to-point forwarding virtual circuit to said source device;

means internal to said first device for associating said point-to-point forwarding virtual circuit with a representation of said source station address; and means internal to said first device for storing said representation of said source station address and said point-to-point forwarding virtual circuit as a related pair.

14. The service of claim 13, further comprising:

means internal to said first device for comparing a virtual local area network identifier contained in said second data message received along said point-to-point receiving virtual circuit with a group of virtual local area network identifiers assigned to said first device; and means internal to said first device for filtering said second data message if said identifier contained in said second data message is not within said group.

15. The service of claim 13, wherein said related pair is stored in hardware.

16. The service of claim 12, wherein said first device is a member of k said seamless communication services, where k is an integer greater than one.

17. A method for configuring a service for seamless communication over an ATM network and for initializing membership of n devices residing at the edge of the ATM network to the service, comprising:

interconnecting the n devices, where n is an integer greater than two, said devices including one master device and n−1 basic devices;

providing each basic-device with an address of said master device;

forwarding a join message from each basic device to said master device, said join message containing an address of said basic device; and forwarding one or more membership messages from said master device to each basic device, said membership messages forwarded to each basic device cumulatively containing all said basic device addresses;

in each of said n devices, associating said addresses of the other n−1 devices with a virtual circuit identifier of a virtual circuit for forwarding broadcast, multicast, and unknown unicast to messages to other n−1 basic devices.

18. The method of claim 17, further comprising:

periodically forwarding sustain messages to said master device from each active basic device;

periodically forwarding one or more membership update messages from said master device to each active basic device, said membership update messages cumulatively containing addresses of all said active basic devices.

19. The method of claim 17, wherein the step of associating said addresses with a virtual circuit identifier comprises:

associating said addresses of the other n−1 devices with n−1 point-to-point virtual circuits over said ATM network to said other n−1 devices.

20. A method for seamless communication over an ATM network having a first edge device and a second edge device, comprising:

maintaining on the first edge device and the second edge device a virtual circuit identifier of a virtual circuit for forwarding broadcast, multicast, and unicast data messages;

receiving, on the first edge device, a message originated by a station behind said first edge device, said message containing an address of a station behind a second edge device;

associating, on said first edge device, a representation of said address with a virtual circuit over said ATM network to said second edge device, and forwarding said message along said virtual circuit without checking on said first edge device the LAN media type for which said message is formatted.

21. The method of claim 20, further comprising:

receiving, on said second edge device, said message;

checking, on said second edge device, the LAN media type for which said message is formatted; and translating said message, if necessary, on said second edge device, into the LAN media type of said station behind said second edge device.

22. A service for providing seamless communication over an ATM network, comprising:

n devices at the edge of said ATM network, where n is an integer greater than two;

means internal to each of the n devices for storing a virtual circuit identifier of a virtual circuit for forwarding broadcast, multicast, and unknown unicast messages to other n−1 devices;

means for interconnecting a local station to said ATM network;

means for receiving a first data message over said ATM network on a virtual circuit, said first data message containing an address of a remote station as a source address;

means for associating said source address and said virtual circuit for learning the source address upon receipt of the first data message;

means for receiving a second data message from said local station, said second data message containing an address of said remote sation as a destination address;

means for resolving said destination address to said virtual circuit; and means for forwarding said second data message along said virtual circuit.

23. A method for initializing a service for seamless communication over an ATM network, the method comprising:

- interconnecting n devices residing at the edge of said ATM network, where n is an integer greater than two, the devices including one master device and n−1 basic devices, each device including a station capable of seamless communication with another station belonging to one of the n devices;
- providing to each basic device with an address of the master device;
- forwarding an address of each basic device to the master device;
- associating, in the master device, each basic device with a point-to-multipoint virtual circuit for forwarding messages to each basic device;
- associating, in the master device, each basic device with a point-to-point virtual circuit for forwarding messages to a particular basic device;
- forwarding in a membership message the addresses of all the basic devices from the master device to each basic device prior to a data transfer from one of the n devices to a destination address associated with another one of the n devices;
- associating, in each basic device, each of the other devices with a point-to-multipoint virtual circuit for forwarding messages to each of the other devices; and
- associating, in each basic device, each of the other devices with a point-to-point virtual circuit for forwarding messages to a particular device.

* * * * *

UNITED STATES PATENT AND TRADEMARK OFFICE
CERTIFICATE OF CORRECTION

PATENT NO.     : 6,337,863 B1
DATED          : January 8, 2002
INVENTOR(S)    : Shekar G. Nair and John W. Bailey It is certified that error appears in the above-identified patent and that said Letters Patent is hereby corrected as shown below:

Column 17,
Line 29, after "storing a" insert -- virtual --.

Column 19,
Line 66, after "unicast" delete "to".

Column 20,
Line 63, replace "sation" with -- station --.

Column 21,
Line 11, after "device" delete "with".

Signed and Sealed this

Fifth Day of August, 2003

JAMES E. ROGAN
*Director of the United States Patent and Trademark Office*